United States Patent [19]
Andersson et al.

[11] Patent Number: 6,044,065
[45] Date of Patent: Mar. 28, 2000

[54] RESOURCE MODEL AND ARCHITECTURE FOR A CONNECTION HANDLING SYSTEM

[75] Inventors: Staffan Andersson, Enskede; Torgny Anders Lindberg, Tullinge; Lars Kent Konradsson, Huddinge; Bengt Stavenow, Lund, all of Sweden

[73] Assignee: Telefonaktiebolaget LM Ericsson, Stockholm, Sweden

[21] Appl. No.: 08/765,160

[22] PCT Filed: Jun. 12, 1995

[86] PCT No.: PCT/SE95/00702

§ 371 Date: Dec. 12, 1996

§ 102(e) Date: Dec. 12, 1996

[87] PCT Pub. No.: WO95/35611

PCT Pub. Date: Dec. 28, 1995

[30] Foreign Application Priority Data

Jun. 13, 1994 [SE] Sweden .................................. 9402055
Jun. 13, 1994 [SE] Sweden .................................. 9402056

[51] Int. Cl.[7] ........................................................ H04J 3/16
[52] U.S. Cl. ............................................. 370/251; 370/469
[58] Field of Search .................................... 370/351, 524, 370/465, 464, 466, 469, 471, 468, 395, 352, 474, 476, 522, 396, 400, 401, 385, 386, 389

[56] References Cited

U.S. PATENT DOCUMENTS 5,159,594 10/1992 Bales et al. .............................. 370/409
5,182,750 1/1993 Bales et al. .............................. 370/384
5,724,242 3/1998 Mitchell et al. ......................... 364/579

FOREIGN PATENT DOCUMENTS 038 147 10/1981 European Pat. Off. .
524 077 1/1993 European Pat. Off. .
WO93/00776 1/1993 WIPO .

OTHER PUBLICATIONS

M. Fabian et al., "Object Oriented Structuring of Real Time Systems," IEEE Proceedings of the 31st Conference on Decision and Control, vol. 3, pp. 2529–2530 (Dec. 1992).

K. Koyanagi et al., "Hierarchically Structured Switching Software," IEEE Global Telecommunications Conference, pp. 1918–1922 (Nov. 1993).

S. W. Tu et al., "An Object–Oriented Resource Model for Supporting Signalling and Control of Broadband Services," Int'l Conf. on Communications, Chicago, pp. 616–621 (Jun. 14–19, 1992).

*Primary Examiner*—Dang Ton
*Attorney, Agent, or Firm*—Burns, Doane, Swecker & Mathis, L.L.P.

[57] ABSTRACT

A resource model for modeling the resources of a telecommunication network that uses a number of different switching technologies. The resource model comprises three layers, a network layer, a node layer and a component layer, each layer comprising resource objects. The resource objects of the network layer are encapsulated to applications which use the network. The resource objects of the node layer are encapsulated to the resource objects of the network layer and the resource objects at the component layer are encapsulated to the resource objects of the node layer. The resource model comprises connection handling function for setting up connections in the telecommunication network. The functions are divided into function components. Function components at the network layer operate on resource objects at the network layer only, function components at the node layer operate on resource objects at the node layer only and function components at the component layer operate on resource objects at the component layer.

5 Claims, 7 Drawing Sheets

RESOURCE MODEL AND ARCHITECTURE FOR A CONNECTION HANDLING SYSTEM

BACKGROUND OF THE INVENTION

The present invention relates to a resource model and architecture for network connection handling in a telecommunication system. In particular the architecture is used for controlling establishment of various types of connections within a distributed network element (NE). The resource model is common to a number of different switching technologies such as STM (synchronous transmission mode) and ATM (asynchronous transfer mode). The resource model as a platform that can be used by a number of different telecommunication applications. Examples of applications are narrow band ISDN (integrated services digital network), broadband ISDN, GSM (global mobile system) networks. PSTN (public switched telephone network).

RELATED TECHNIQUE

In IEEE, 1992, vol 2,p 616–621 there is described a resource model that support a set of broadband communication configurations such as point-to-point connections, point-to-multipoint connections, multipoint-to-point connections and multipoint-to-multipoint connections. The resource model comprises a set of fundamental object types that can be flexibly linked in various ways to support a wide range of communication configurations and form compound object types. This approach is analogous to that used in the UNIX™ operating system where files, processes and devices can be linked using pipes, tees and other objects. All objects in the object model are derived from the abstract classes "Edge" and "Vertex" which in their turn are derived from the abstract base class "Resource". Fundamental methods of graph theory are used to model the transport (edges) and processing (vertices) of information streams.

In WO 93/00776 there is described a software architecture for use in program controlled switching exchanges in which application modules are employed to provide services to users of an individual communications application. Resource modules provide specific functional elements of communications services to the applications modules by having access to and control over the exchange hardware.

A drawback with the known resource models is that the resource model is different for different switching technologies.

Another drawback with the known resource models is that an application is integrated with connection control. In practice this means that an application must know (i) the detailed structure of the network it uses, (ii) the detailed network devices used in the network.

It will therefore be difficult to develop new applications, since people involved in such development must have detailed knowledge of the network structure and of the devices used in the network.

It will also be difficult to replace an existing device, such as for example an switch residing in an exchange, an exchange terminal and similar devices, with a new one since the implementation of the new device will have impact on the application. Accordingly the application need to be modified to the new device.

It will also be difficult to expand, contract or otherwise modify existing network since any change made to the network must be reflected in the application.

Another drawback is that an application must know the type of connections it shall use. If new connection services, such as multipoint-to-point connections, are developed, they must be integrated in each of the applications wanting to use the new connection service.

DESCRIPTION OF THE INVENTION

An object of the present invention is to provide a new resource model and architecture which reduces the above disadvantages by separating the application from the connection control. In particular the connection control is accomplished by functions in the resource model architecture. The resource model in its turn is separated from the application.

Another object of the present invention is to provide a generic resource model that is common to different switching technologies.

Still another object of the invention is to provide a resource model which is used to model bearer service networks which are independent of the applications which uses the bearer service networks.

The resource model in accordance with the invention is generic to all kinds of switching technologies. Examples of switching technologies are ATM VC (ATM virtual connection) and STM-64 k. In the following an individual switching technology is referred to as a bearer service.

The resource model supports managment aspects of the network as well as establishment of connections.

The resource model architecture will model existing resources as well as control functions which take part in the dynamic behavior of establishment of connections within a bearer service network.

The resource model will support telecommunication services which are divided into a call part and a connection part. The resource model in accordance with the present invention requires that an application is responsible for service related signalling.

The way the resource model is designed will allow a telecommunication service that is used for establishment of connections of different types, such as point-to-point connections, point-to-multipoint connections, multipoint-to-point connections, to be independent of the application using the service and to be independent of the service signalling part.

The generic resource model in accordance with the invention comprises objects which are specialized for each bearer service.

The resource model in accordance with the invention uses resource objects that are separated into three layers, in particular a network resource layer, a node resource layer and a component resource layer.

The bottommost layer is the component resource layer on top of which the node resource layer is present. On top of the node resource layer is the network resource layer.

Accordingly there will be a set of resource objects at the network layer, another set of resource objects at the node layer and still another set of resource objects at the component layer. The resource model models the resources available within a distributed NE. Objects at the network layer have configurated relations with objects at the node layer, which in turn have configurated relations with objects at the component layer.

The use of configurated relations makes it possible to find said end points at each of the three layers as seen from an addressing point of view. The use of configurated relations will make it possible to propagate status information from devices, residing in the physical network, to the application. Such status information may for example be faults appearing in a device.

Resource objects at the network layer generally comprise logical network objects, switch fabric objects, routing objects and trunk group objects. Resource objects at the network layer are seen from a network point of view and do not have any detailed knowledge of the internal structure of resource objects at the node layer. Using software language to express this latter feature objects at the network layer are said to encapsulate resource objects at the node layer. The meaning of this is that a resource object at the network layer is generic/common for resource objects at the node layer irrespective of the physical implementation of a node layer resource object.

Resource objects at the node layer generally comprise node objects and objects relating to bandwidth and time slots. Resource objects at the node layer have no detailed knowledge of the internal structure of resource objects at the component layer. Resource objects at the node layer are said to encapsulate resource objects at the component layer. The meaning of this is that a resource object at the node layer is generic/common for resource objects at the component layer irrespective of the physical implementation of a component resource.

Resource objects at the component layer generally comprise switch objects and device objects.

An application uses resource objects at the network layer. This means that an application does not care of the internal structure of a logical network and the kind bearer service used therein.

An application must know the bearer services it shall use and it must also know which type of connections, such as point-to-point connections, point-to-multipoint connections and similar, in the bearer service it shall use. Accordingly there must be corresponding configurated relations between an application and the end points of a connection.

The application will point out the end points of a connection. Accordingly the end points of a connection must be included in a bearer service so that they can be addressed correctly by the bearer service.

All resource objects are stored as data items in a data base in the telecommunication system wherein the resource model in accordance with the invention is used.

The telecommunication system may comprise several data bases. Each data base will serve an individual geographical part, referred to as a network element NE, of the telecommunication system.

The described layers and object encapsulation serve the objective to allow for changes in the physical telecommunication network, the logical networks, the nodes and components without the need to make any changes to the resource model. It also allows an operator to configure logical networks without any detailed knowledge of the components, i.e. the hardware used. The operator does such configuration from a standard terminal used in an operation and support system of the telecommunication system. He specifies the logical networks by defining relations between the objects at the network layer. He also defines the relations between the bearer service networks and the devices appearing in the physical network.

Using the resource model in accordance with the invention a system specific exchange used in a physical network may be replaced by another vendor's system specific exchange without the need to make any changes in the network objects.

In accordance with another aspect of the present invention there is also provided a resource model architecture comprising, further to said layers of objects functions operating on said objects. In particular said functions are separated into three layers corresponding to those of the objects. Accordingly there are functions at the network layer that operate on the resource objects at the network layer, there are functions at the node layer that operate on the resource objects at the node layer and finally there are functions at the component layer that operate on the resource objects at the component layer.

An application can communicate with functions at the network layer via first reference point. Functions at the network layer can intercommunicate and can communicate with functions at the node layer via a second reference point. Functions at the node layer can intercommunicate and can communicate with functions at the component layer via third, fourth and fifth reference points.

The functions used in the architecture are traffic functions that capture the dynamic behavior of connection handling. Further there exists operation support functions. An application may order a function at the network layer to set up a connection. Depending on the individual application a function at the network layer can set up a connection dynamically, semipermanent or permanent.

In particular functions at the network layer are used to configure logical networks and to set up point-to-point connection, point-to-multipoint connections, multipoint-to-point connections as well as other connection related functions.

Functions at the node layer are used to set up connections through a node.

Functions at the component layer are used to manipulate the different components and to propagate status information to the node.

The separation of functions into the various layers makes it possible to configure a logical network and to test functions at each logical node separately.

The separation of functions into the various layers will also make clear how the responsibility for various activities in the telecommunication network is distributed.

DETAILED DESCRIPTION OF THE INVENTION

Figure 1:
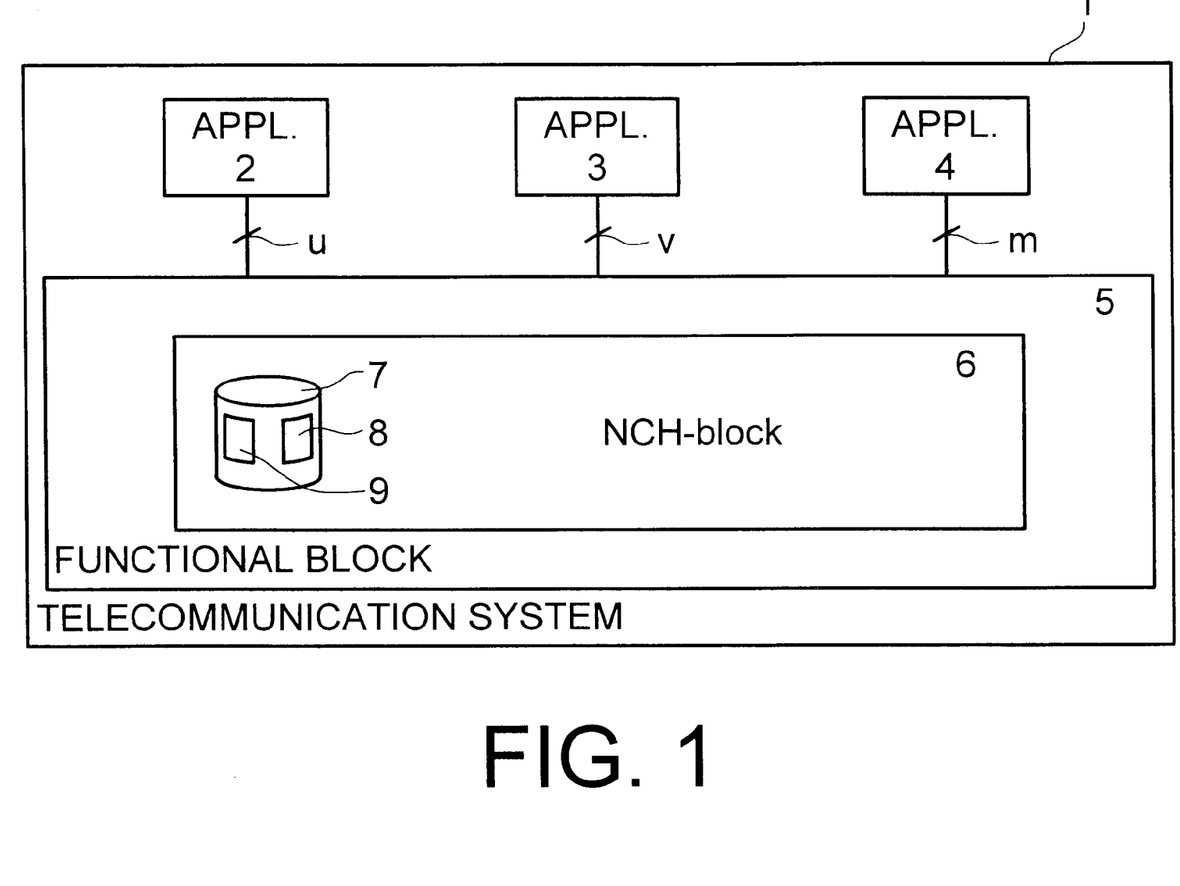
FIG. 1 is a block diagram showing a logical view of a telecommunication network wherein the resource model in accordance with the invention is used

In FIG. 1 there is shown telecommunication system 1 and a number of different telecommunications applications 2, 3 and 4 which are running on a functional block 5. The functional block 5 comprises functions and resources which are common to all of the applications. Examples of common resources are switches, trunk lines and traffic load supervision devices. Examples of common functions are connection handling, network description functions. Other examples are functions relating to charging, to operation and support.

Within block 5 there is a network and connection handling block 6, NCH-block, comprising representations of the resources of the system 1. The resources are represented by software objects which in turn are stored in a data base 7 in the form of data items. The data base 7 serves an individual network element NE of the overall physical network, not shown in FIG. 1, of the telecommunications system 1. Accordingly the resources of different network elements NE:s are handled by different data bases.

Further the data base 7 is used by connection handling functions and network descriptions both to be described further down.

An individual application is connected to an individual network and will use the resources of the individual network. Said individual networks, also referred to as logical networks, will in their turn use the resources of said non shown physical network and are configured by an operator, not shown, which for this purpose will use said network description functions. This will be exemplified below in connection with FIGS. 3 and 4.

Bearer services used by any of the applications are schematically shown at 8 and 9 in the data base; bearer service 8 being, as an example, STM 64 kbit/s and bearer service 9 being, as an example, ATM VC. Each one of the bearer services in the system has its own control logic. The control logic is expressed in terms of functions also to be described in connection with FIGS. 3 and 4.

The representations of resources and functions common to the applications are structured in accordance with the resource model of the present invention, i.e. the objects and functions are structured following a layered model to be described next in connection with FIG. 2.

Figure 2:
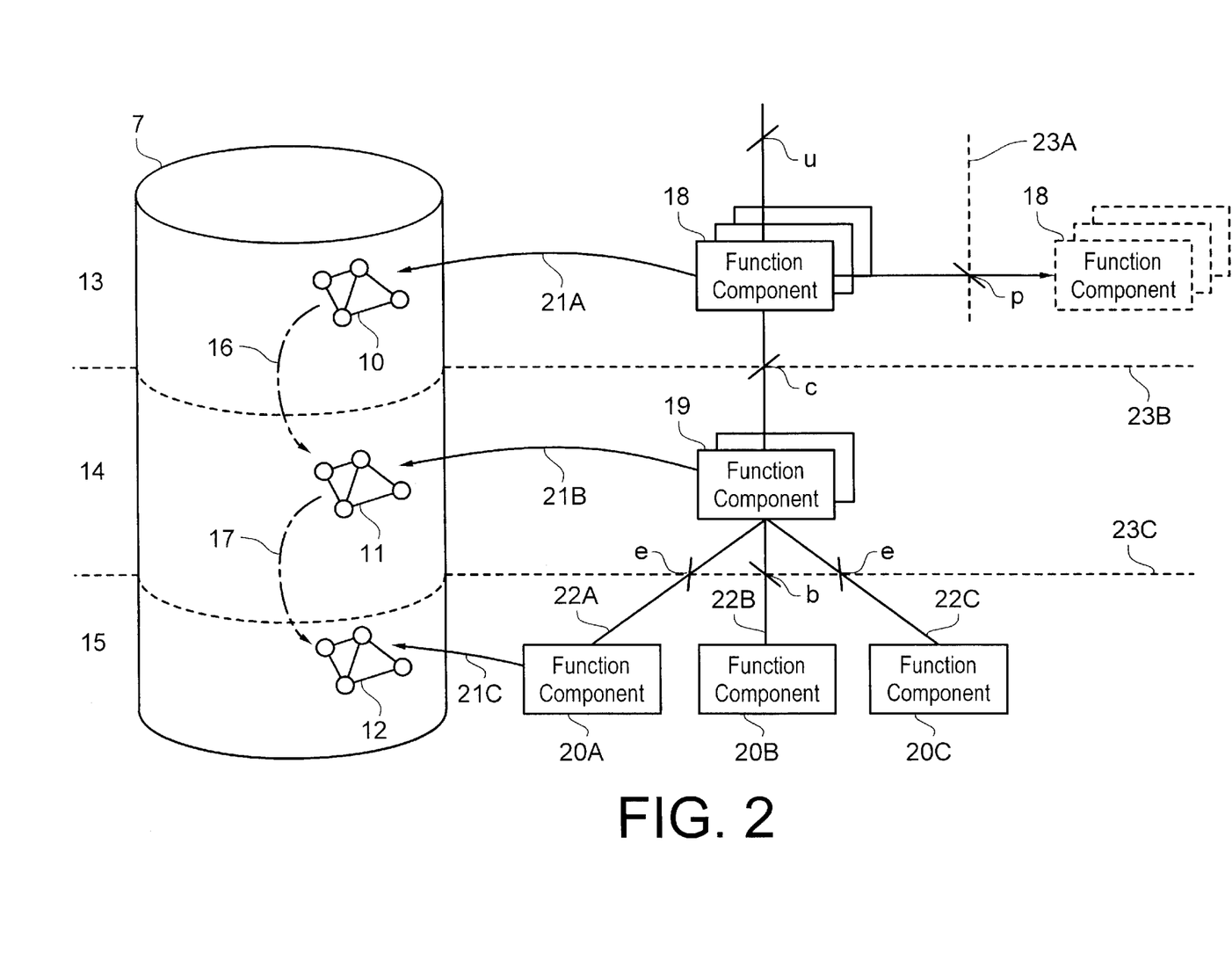
FIG. 2 is a block diagram of a network and connection handling architecture in accordance with the invention.

In FIG. 2 the data base 7 is shown to comprise models 10, 11, 12 of resources. In accordance with the invention a resource is modelled using a three layer structure. The top layer is called the network layer 13, the middle layer is called the node layer 14 and the lowest layer is called the component layer 15.

Model 10 at the network layer is a network model that describes the general layout of the logical network, the nodes of the network, the type and the amount of resources between the nodes and the way a connection is routed in the network. Accordingly this model 10 comprises network objects, node objects, routing objects and other objects needed by an application to set up a connection. Model 10 does not describe the detailed structure of a resource object at the node layer.

Is for example an exchange in the physical network replaced by a new one containing new internal functional units not present in the old one, then the replacement will not entail any changes in the model 10 at the network layer.

Model 11 at the node layer describes the resources available in each one of the nodes of the network model 10. Accordingly it comprises node objects. Objects at the node layer do also describe the way the functionality of a node is divided between the switch and components. In other words a node object reflects the division of the functionally between different node implementations. Objects at the node level do not describe the detailed structure of a resource object at he component layer. Accordingly an object at the node layer will hide the implementation of an object at the component layer.

Consider the above example with the replaced exchange. The old exchange and its exchange terminals, ET:s, (a device object at the component layer) has their respective functionalities divided among themselves in a particular manner so that some of the functions are performed by the node and some by the ET:s. When the new exchange is inserted into the system the respective functionalities will probably be divided among the exchange and its exchange terminals in another manner, different from the first. The existing differences between the first and second manners will be reflected by the node object at the node level, which has to be manually patched, but will not, as explained above, entail any amendments of the node object at the network layer.

Model 12 at the component layer comprises switch objects and device objects. Examples of switch objects are switches of different implementations. Examples of device objects are exchange terminal objects (ET objects) subscriber line interface card objects, tone sender objects, echo canceler objects, teleconferencing equipment objects.

Objects at the network layer 13 have relations to objects at the node layer 14 which in turn have relations to objects at the component layer. Said relations are schematically shown by arrows 16 and 17. This will be further illustrated in connection with FIGS. 6, 7 and 8. The relations are created when the objects are constructed.

The resource model will accordingly comprise the union of the objects at the network, node and component layers together with the relations existing between objects at the three layers.

If an existing component, for example an echo canceler, is replaced with a new one, then this replacement need to be reflected in the echo canceler object at the component layer and nowhere else in the network model.

Like an object at the network layer hides the implementation of an object at the node layer, an object at the node layer hides the actual implementation of an object at the component layer an application will hide the implementation of a network object.

In accordance with the resource model architecture of the present invention functions operating on the resources of the telecommunication system 1 are layered in a similar manner as objects are and are operating on objects residing at the corresponding layer. To this end the functions are divided into components. In particular there are function components 18 at the network layer, function components 19 at the node layer and function components 20A, 20B, 20C at the component layer.

Function components 18 at the network layer are operating on resource objects at the network layer as is illustrated by arrow 21A, function components 19 at the node layer are operating on resource objects at the node layer as is illustrated by arrow 21B and function components 20A–C are operating on component layer objects as is illustrated by dashed arrow 21C.

Applications communicate with function components 18 at the network layer via a reference point u, m or v depending on the individual application. Further to operate on resource objects at the network layer function components 18 at the network layer may communicate with function components 19 at the node layer via a reference point c. Further to operate on resource objects at the node layer function components 19 at the node layer may communicate with function components 20A–C at the component layer via reference points e and b. These will be described further down.

The resource model shown to the left in FIG. 2 together with the function components operating on it will together form an architecture of the system 1. The system architecture in its turn is a layered structure. Dashed line 23B is the interface between the network layer and the node layer, while dashed line 23C is the interface between the node layer and the component layer.

An application communicates with function components at the network layer only. The point u acts much like an interface. Function components 18 at the network layer communicate with function components 19 at the node layer via the reference point c which also acts much like an interface. Function components 19 at the node layer which communicate with a function component 20B, a switch function component, at the component layer do this via a reference point b. Function components 19 at the node layer which communicate with device function components 20A, 20C and with exchange terminal device function components, do this via reference points e.

Since the NCH-block 6 hides the details of a bearer service network to an application, the application cannot distinguish a single node from a distributed node. This will simplify bearer service network handling and connection handling since the internal structure is not known to the application.

Typically an application will request the NCH-block 6 to set up a connection. The application will thus have no information on the way the requested connection is set up. This feature will allow a vendor of the telecommunications system to provide the telecommunication system 1 to a system user which can design his own applications. In the design process the system user needs no knowledge of the internal telecommunication system 1.

Typically a function component at the network layer is a connection establishment function component which uses some of the objects that are present in the model that describes a network. Typically such objects are objects for selecting of a resource and objects for finding a route between nodes in the network. Once the connection establishment function has found a route it must operate the nodes along the route in order to set up a connection. To this end the connection establishment function communicates with node layer functions at the node layer. At the node layer there are node connection functions connecting a node to a route. The reference point c describes how the connection establishment function and the node connection functions interwork.

As mentioned above there are, at the component layer, different types of device objects such as switch objects relating to switches of different implementations and exchange terminal objects (ET-objects). Suppose the node with which the connection establishment function component at the network layer communicates is located centrally within the network object. Accordingly the corresponding exchange object at the component layer will have ET-objects at its input as well as at its output. At the component layer three function components will therefore be called by the node connection function component. In particular an ET connection 22A, an exchange connection 22B and still another ET connection 22C are requested. Reference points e describe the interworking of the node and ET-connections while reference point b describes the interworking between the node and the switch.

The difference between reference points u, v, m on the one hand and reference points c, e, b at the other is that former access the connection establishment function 18 without accessing the data base 7, while the latter do access the data base. Expressed in other words: each one of the reference points u, v, m acts an interface for an application. The application will access a function 18 only, and will not care about the detailed structure of the network. The functions 18, 19, 20A, 20B, 20C, however, will use the resource model stored in the data base.

The resource model architecture of the present invention comprises, further to the connection establishment functions mentioned in the introductory part of the specification, functions for terminating end points of a connection. Said latter functions may terminate a connection in different ways, so therefore there are different types of such functions.

Further the resource model architecture of the present invention include operation and maintenance flow functions of various kinds.

When new types of connection establishment functions are to be introduced into the communications system 1 a new connection function is divided into function components corresponding to the layers 13, 14 and 15. In particular the new function component at the network layer is merely added to the existing ones at the network layer. An application may then request a connection of the new type. In similar manner the new function component at the node layer is added to the existing ones at the node layer and the new function component at the component layer is added to the existing ones at the component layer. This possibility to add new connection functions to the existing ones provides a modularity aspect of the present invention.

Function components 18, 19 and 20A–C in FIG. 2 represent a typical on demand connection establishment function. An application requests the connection establishment over the reference point u and defines the end-point of the desired connection and will then expect the connection establishment function component 18 to accomplish the establishment. If one of the end-points resides in a network element NE different from that served by data base 7, connection establishment function component 18 starts another connection establishment function component 18, shown by a dashed rectangle, in that network element. The two connection establishment function components 18 will then communicate via a reference point p. The network element NE served by data base 7 is shown to the left of the dashed vertical line 23A in FIG. 2.

The connection establishment function, 18 as an example, sends a connection establishment request to the node connection function component 19 via the reference point c and the node connection function component 19 distributes the request to the switch connection function components 20B and to the device connection function components 20 A–C. The bearer services typically used for on demand call establishment functions are ATM VC and STM 64 kbps.

Figure 3:
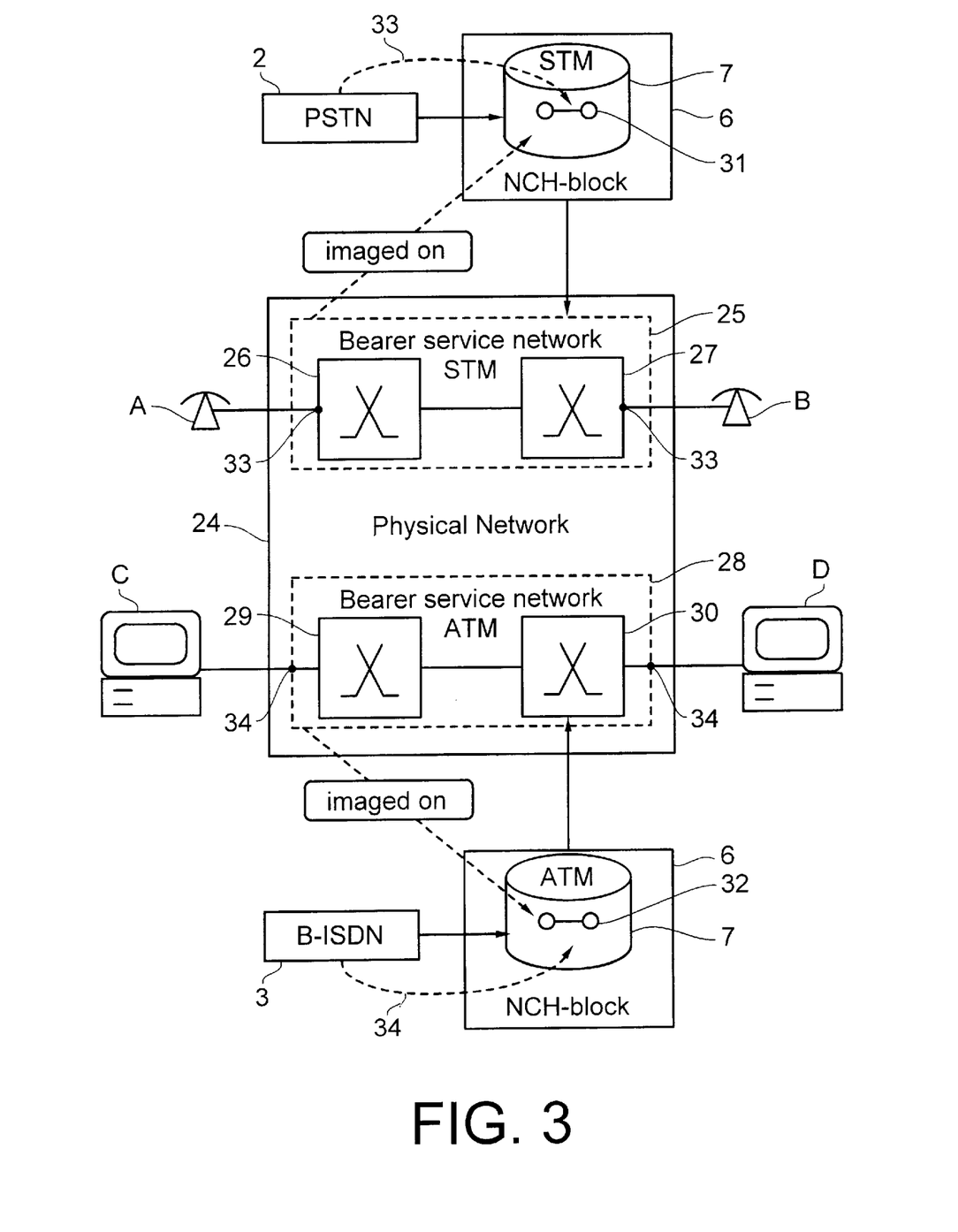
FIG. 3 is a block diagram illustrating a physical network, different applications and two data base stored models created in accordance with the invention.

In FIG. 3 there is shown a physical network 24 to which subscribers A, B, C, D have access. Subscribers A and B have each a telephone set while subscribers C and D have each a terminal equipment. Subscribers A and B are connected to a bearer service network 25 using the STM switching technique, said network comprising two switches 26 and 27. Subscribers C and D are connected to another bearer service network 28 using the ATM switching technique, said network comprising two switches 29, 30.

An application 2, in this case PSTN (public switched telephone network), uses the functional block 6 comprising the data base 7. Another application 3, in this case B-ISDN, uses the same functional block 6. Two functional blocks 6 and two data bases 7 are shown for illustrative purposes only, but in practice there is only one functional block and only one data base. A first network description 31, in the form of data items, of the bearer service network 25 is stored in the data base 7 and a second network description 32, in the form of data items too, of the bearer service network 28 is stored in the data base 7. The network descriptions of the two networks 25 and 28 are different. During configuration of the two networks 25 and 28, to be described in connection with FIG. 4, there is created a relation 33, referred to as a configured relation since it is created during configuration, between the PSTN application 2 and the network layer 13 of the STM network description 31. The configured relation 33 expresses end points, sometimes also referred to as edge point or rand points, in the bearer service network 25. In the PSTN application 2 these end points represent the two access points 33 of the telephone sets to the network 25. When the PSTN application 2 orders a connection be set up between A and B the application sends a connection request, containing a reference to the desired type of connection, to the NCH-block 6 within the functional block 5. In particular the connection request selects the connection function that provides the requested type of connection. Next the relation 33 is used to point out the end points 33 in the bearer service network 25. Next the selected connection function uses the data base 7 and the functions at the node layer therein, said functions at the node layer in their turn will use the functions at the component layer in order to set up the connection. Accordingly, the application does not see how the network 27 looks like, as mentioned several times before. All control logic used for establishing a connection is separated from the application and resides in the NCH-block 6. In particular said control logic resides in the functions 18, 19, 20A–C used for connection establishment.

A similar configured relation 34 exists for the bearer service network 28 and is used to point out the two end points 34, 34 for a connection between C and D.

Figure 4:
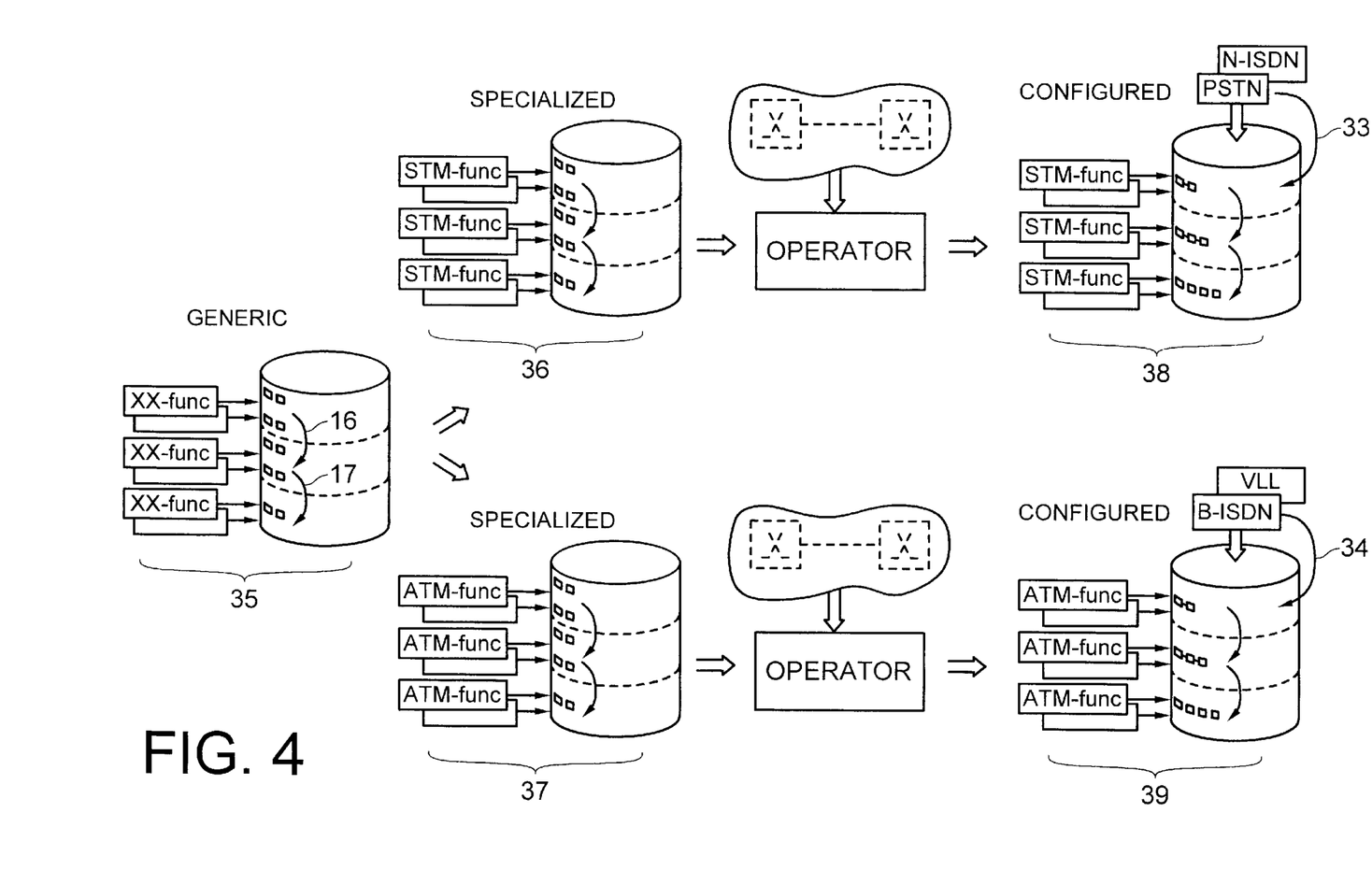
FIG. 4 is a block diagram schematically illustrating the manner in which a generic resource model is used to create two specialized resource models from which an operator creates configured bearer service networks.

In FIG. 4 a generic resource model 35 is shown comprising functions common to different switching techniques, said functions operating on resource objects symbolically shown by small squares. The functions and the objects are structured into layers 10, 11, 12 as described above. Generic functions and objects needed for connection establishment have been identified by the inventors and are described in the appendix for different type of connections. The generic objects at the network layer have relations, collectively illustrated by arrow 16, to generic objects at the node layer 11, which in their turn have relations, collectively illustrated by arrow 17, to generic objects at the component layer 12.

The generic resource model is next specialized for different switching techniques. In the illustrated example two switching techniques are shown, STM and ATM. Such specialization is done for the functions and for the objects. The specialization is done manually and to a certain extent automatically. The result is two specialized resource models 36 and 37, one per switching technique.

Next an operator plans how the bearer service network should look like. Using the imaginary picture of the service network he next data sets the resource objects, referred to as configuration, by mapping them against resources in the physical network 24. Such mapping is expressed by relations. This is done for each one of the switching techniques. The operator need not to be one and the same person/ organization. The service networks 25, 28 are most certainly not identical, although they have been illustrated so. The result of the configuration is two configured resource models 38, 39, also referred to as network descriptions, on which the respective specialized functions operate.

As illustrated different applications, such as PSTN and N-ISDN may run on the same configured resource model 38. An application must have a configured relation 33 to the resource model. As described above the configurated relation 33 expresses the end points of a connection.

As illustrated different applications, such as B-ISDN and VLL (virtual leased lines), may run on the same configurated resource model 39. Each application must have a configured relation 34 to the configured resource model 39 by way of which it will be possible to find the end points in the physical network.

Figure 5:
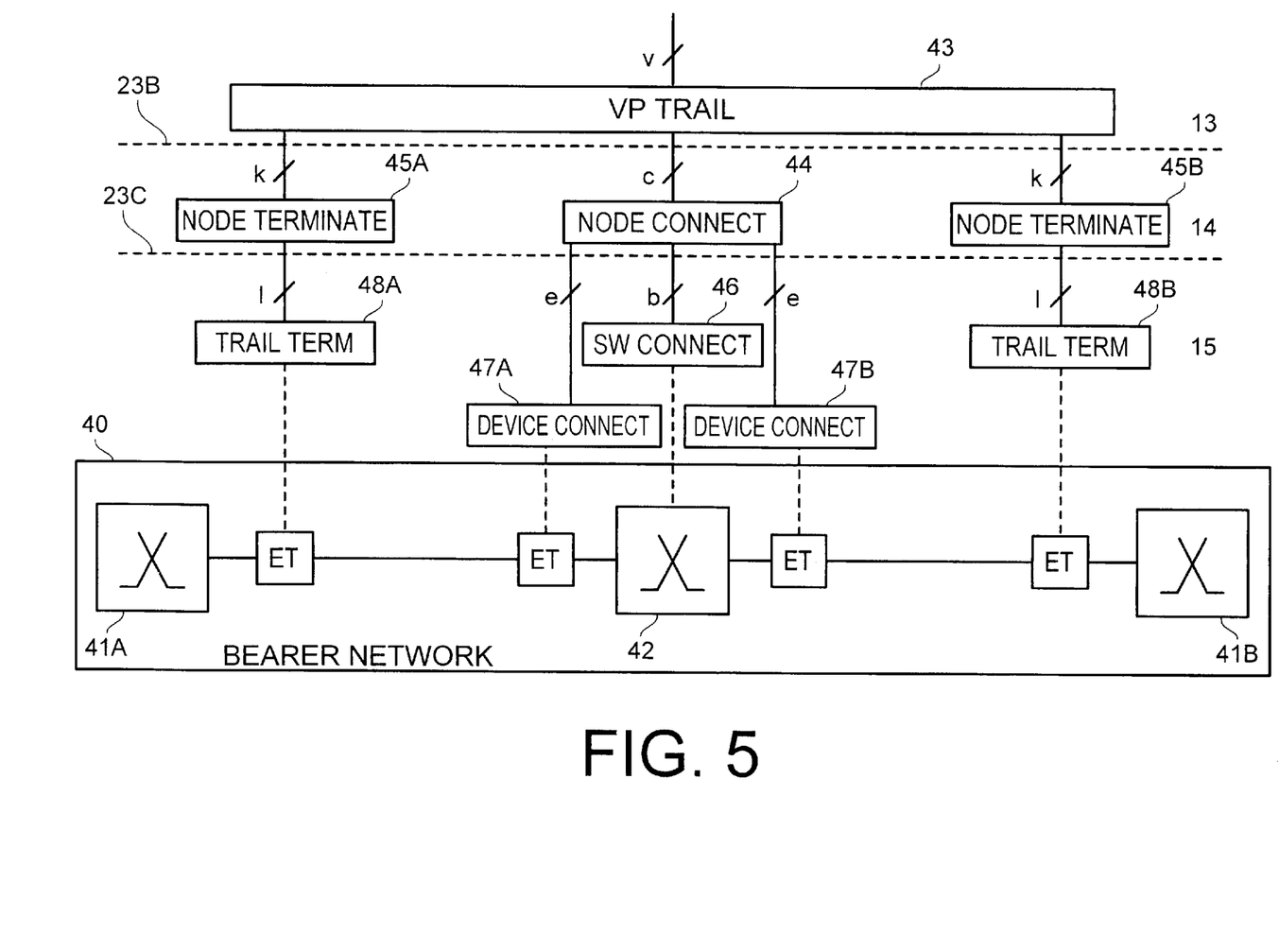
FIG. 5 is a block diagram of some function components, at the network layer, used for establishing a trail in the telecommunication network.

In FIG. 5 there is shown a typical trail establishment function. Trail establishment is similar to the connection establishment described with reference to FIG. 2 with the exception that trail termination at the end-points is added. To terminate a trail means that the end-points are activated for maintenance purposes. Trails are often supervised by means of different types of operation and maintenance information flows. The end-points of a trail activate these flows upon receiving a trail termination order.

In FIG. 5 the trail termination points reside at the boundaries of a VP (virtual path) bearer network 40 close to VC (virtual channel) nodes 41A, 41B. The network also comprises a VP switch 42. Each VC node has a respective exchange terminal ET while the VP switch has two exchange terminals ET. A VP trail function 43, residing at the network layer, establishes a connection through the VP switch by interworking, at a reference point c, with a node connection function 44 and, at reference points k, with two node termination functions 45A and 45B residing at the node layer. The node connection function 44 interacts, at reference point b, with a switch connection function 46 and, at reference points e, with two device connection functions 47A, 47B at the component layer. Each of the node termination functions 45A, 45B interact, at reference points 1, with a respective trail termination function 48A, 48B, also residing at the component layer, which operates on a respective ET.

Figure 6:
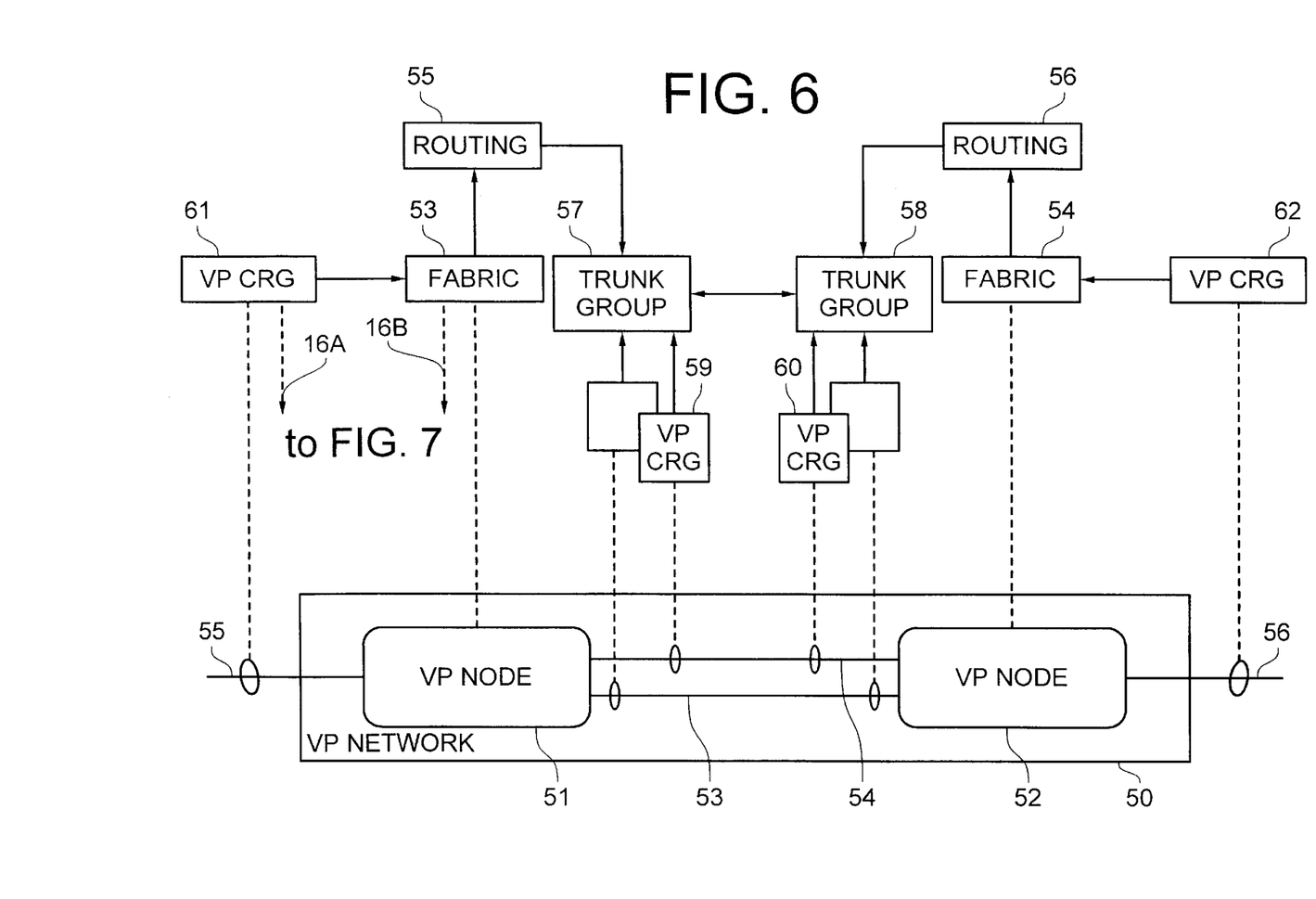
FIG. 6 is a block diagram showing resource objects, at the network layer, of a simple VP (virtual path) network.

Having described some functions involved in establishment of a VP trail there will next be described some specialized objects used to represent, at the network layer, a VP network.

In FIG. 6 a VP network 50 is shown.

The VP network comprises two VP nodes 51, 52 as well as trunks 53, 54 between the nodes and trunks 55, 56 to other adjacent, non shown VP nodes. Each trunk is indicated by the solid horizontal lines in the VP network. To support the network functions each of the nodes 51, 52 must be represented by an individual VP fabric object, 53 and 54 respectively and by VP routing objects labelled 55 and 56 respectively. The VP fabric objects are used for addressing purposes, while the VP routing objects are used for routing analyses. Every trunk is represented by one or more trunk related objects. Trunk related objects will provide a view of the resources on the trunks. Examples of such resources are bandwidth, channel numbers and time slots.

In particular there are VP trunk group objects 57, 58 that each groups a number of VP CRG (Connection resource group) objects 59 and 60 respectively. Each trunk group object represents a respective physical VP link. By pointing out a VP trunk group object a VP routing object implicitly points out the next node to which the requested connection should be routed.

When a VP application requests a connection establishment it expresses the end-point addresses in the form of network element, nodes, VP resource objects and channel numbers.

Figure 7:
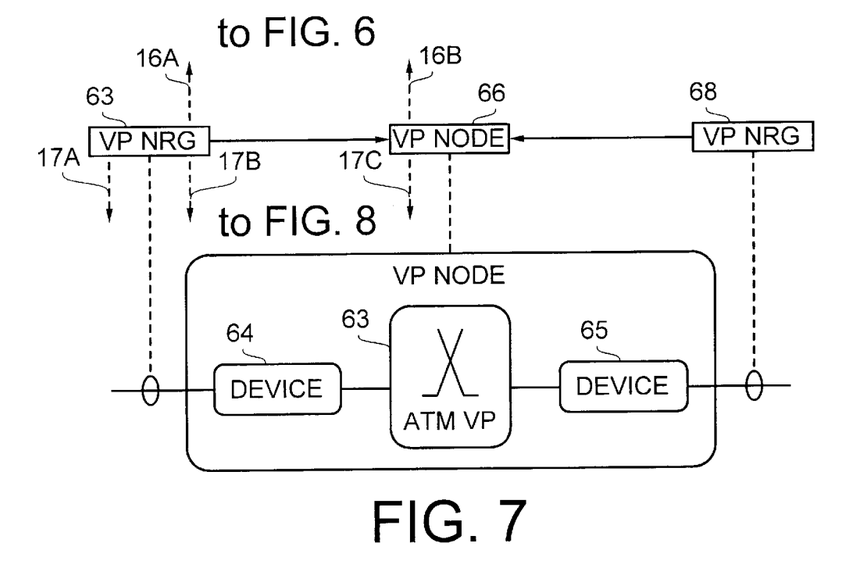
FIG. 7 is a block diagram showing resource objects, at the node layer, of a VP node in the network shown in FIG. 6

Dashed arrows 16A, 16B appearing in FIG. 4 represent configurated object relations between objects at the network layer to objects at the node layer shown in FIG. 7. They have only been shown for objects 61 and 53 for the sake of clearness, but exist also for other objects at the network layer. The vertical dashed lines illustrate what the objects represent in the VP network 50.

In FIG. 6 the objects have been specialized to support a VP bearer service.

Next resource objects used to describe a VP node at the node layer will be described in connection with FIG. 7.

The VP node shown in FIG. 7 comprises an ATM VP switch 63 as well as devices 64, 65 connected thereto. Typically the devices are exchange terminals (ET:s). A VP node object 66 represents the VP node as a whole, VP NRG (node resource group) objects 67 and 68 represent the resources of the VP node. The node objects 66, 67, 68 have been specialized to support the VP bearer service. As described previously all objects at the node level are encapsulated from the network layer. Dashed arrows 17A, 17B and 17C appearing in FIG. 7 represent configurated object relations between objects at the node layer to objects at the component layer shown in FIG. 8. They have only been shown for objects 63 and 66 for the sake of clearness, but exist also for other objects at the node layer. The vertical dashed lines illustrate what the objects represent in the VP network 50. In FIG. 7 the vertical dashed lines illustrate what the objects represent in the VP node.

Figure 8:
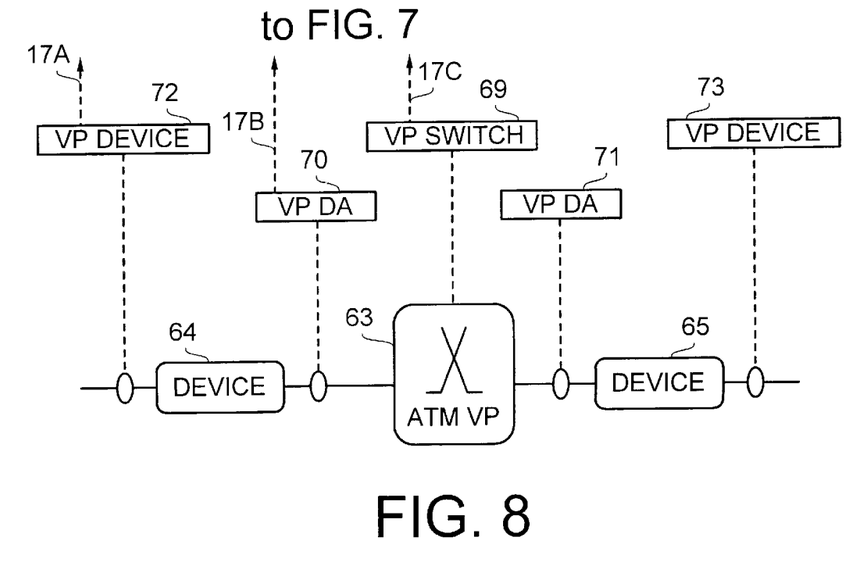
FIG. 8 is a block diagram showing resource objects, at the component layer, associated with a VP (virtual path) switch and two VP (virtual path) devices.

Finally in FIG. 8 some resource objects at the component layer are shown. The illustrated objects describe the ATM VP switch 63 and its devices 64, 65. In particular there is a VP switch object 69, VP DA objects 70, 71 and VP device objects 72, 73. The VP switch object 69 represents the resources and limitations associated with the ATM VP switch. The VP DA objects represent the resources associated with a certain bearer service at an entrance and exit point of the VP switch 63. The VP device objects 72, 73 is self-configurated and is related to the actual transmission. It describes the limitations for connections and trails. Examples of such limitations are maximum bandwidth on the link, maximum number of simultaneously established connections and VPI value range.

In FIG. 8 the object relations 17A, 17B and 17 C are shown. The vertical dashed lines illustrate what the objects represent in a component.

A network element NE is referred to as a zone. The XX prefix used in the function definitions is generic to different switching techniques. When a function is specialized the XX prefix is changed to reflect the specific switching technique, such as for example ATM and STM.

Description of the Functions

Network Functions

XX Zone-Connection

Zone-Connection establishes a connection between two end-points at the boundary of the telecommunication network.

The Zone-Connection function deals with network routing, which means that it decides which nodes to pass and which trunks to use between the nodes. By requesting resources from objects in the network layer in the resource model, the Zone-Connection function seizes resources between the nodes. The Zone-Connection starts up a Node-Connection for each node to pass and orders it to establish a connection through the node.

The function can initiate and communicate with the same type of function in another zone when a connection is established is an AXE-N network which covers several zones.

There will probably be several different variants of the function Zone-Connection. For instance, a Zone-Connection optimized for a network consisting of a single node does not have to include functionality for network routing, resource handling of trunks, or inter-zone communication.

XX Point-to-Multipoint-Zone-Connection

The Point-to-MultiPoint-Zone-Connection is similar to the Zone-Connection but includes some additional functionality for routing and handling of distribution points. When adding a leaf (a connection) to an already established point-to-multipoint connection, the function decides where to distribute to the leaf. To optimize the network handling, the leaves are distributed as close as possible to the destination end-point. The Point-to-MultiPoint-Zone-Connection starts up a Node-Connection for each node to pass and orders it to establish a connection through the node.

The function can initiate and communicate with the same type of function in another zone when a connection is established in an telecommunication network which covers several zones.

XX Zone-Trail

The Zone-Trail establishes trails where both trail-termination points reside within the telecommunication network. A Zone-Trail can either be invoked by an application or by the function Dynamic-Infrastructure-Handler. It is similar to the function Zone-Connection, but includes functionality for terminating the end-points. The Zone-Trail starts up a Node-Connection for each node to pass and orders it to establish a connection through the node. In addition, it starts up a Node-Trail-Termination function at each end-point.

The function can initiate and communicate with the same type of function in another zone when a trail is established in a telecommunication network which covers several zones.

There will probably be several different variants of the function Zone-Trail. In case of capacity optimization, for instance, a Zone-Trail function used for dynamic establishment of the infrastructure can omit the explicit trail-termination.

XX Asymmetric-Zone-Trail

The Asymmetric-Zone-Trail is similar to the function Zone-Trail, but establishes trails where one of the end-points reside outside the telecommunication network (and hence is not controlled by this function). This function is only used for dynamic establishment of trails and is not offered to applications.

XX Zone-Trail-Termination

The Zone-Trail-Termination function transfers trail-termination requests to the function Node-Trail-Termination. The objective with this function is to hide the system components for the applications. The applications can use the same addresses for connection establishment as for trail termination.

The Node-Trail-Termination function is introduced between the Zone-Trail and the Trail-Termination function. The reason for this is to remove the coupling between the network layer and the components.

XX Virtual-Node-Connection

The Virtual-Node-Connection establishes a connection through a node supporting switching in an underlying stratum. If the underlying infrastructure is established dynamically, the nodes in that stratum must be visible in the overlying network. The Virtual-Node-Connection starts a Node-Connection for the underlying stratum.

The Virtual-Node-Connection is only required if the infrastructure is established dynamically and if the nodes associated with the underlying infrastructure reside at the boundary of the network.

XX Node-Cross-Connection

Node-Cross-Connection establishes a cross-connection through one node. The applications must have acquired the resources on the rim of the node. The Node-Cross-Connection function stores the representation of the cross-connection persistently and it orders the Node-Connection to establish a connection through the node.

The Node-Cross-Connection function is intended for applications that has an information model through which the connections are ordered. With this function, adaptation layer applications (as e. g. VLL, virtual leased lines) are given a possibility to see each node in the zone, which is useful if the application's routing domains do not comply to the zone partitioning, or if the network-internal trunks must be represented in the information model towards the OSS (operation and support system).

The function is intended to comply to the MO (managed object) architecture concept.

If the zone partitioning is enough for the application's information model, then the function Zone-Connection can be used instead, with specification of a durable connection. The internal structure of the connection will then not be visible to the application.

XX Point-to-MultiPoint-Node-Cross-Connection

Point-to-MultiPoint-Node-Cross-Connection is similar to Node-Cross-Connection. The difference is that the P-MP variant prepares the switch on that this will be a distribution. This is done already when the first branch is established.

Dynamic-Infrastructure-Handler

The Dynamic-Infrastructure-Handler coordinates the end-points of a trail or an asymmetric trail and thereafter initiates a Zone-Trail or an Asymmetric-Zone-Trail, respectively. The Dynamic-Infrastructure-Handler is initiated by a resource handler dealing with resources at the edge of a node. It is introduced to reduce the complexity of the resource handler and the load on the fault-tolerant processor (FTP), executing the resource-handler process.

The Dynamic-Infrastructure-Handler adds the resources associated to the established trail or asymmetric trail to the invoking resource handler in the overlying network.

XX Node-Connection

The Node-Connection establishes a connection between two points at the border of the node. The points are defined by the network function invoking this node function.

The Node-Connection encapsulates nodes and hides implementation details of the system components from the network layer. It distributes orders received from network functions to device and switch functions.

XX Node-Trail-Termination

The Node-Trail-Termination encapsulates nodes and hides the system components that perform the real trail termination. The Node-Trail-Termination function is introduced between the Zone-Trail and the Trail-Termination function. The reason for this is to remove the coupling between the network layer and the components.

Device Functions

XX Device-Connection

The Device-Connection accomplishes orders received from the node function. It controls the hardware associated with the system devices and ensures that a requested connection is established through that part of the hardware.

XX Trail-Termination

The Trail-Termination is the function that accomplishes the trail-termination request. It activates the OAM flows by ordering the hardware and, possibly, prepares the software for reception of performance data.

Switch Functions

XX Switch-Connection

The Switch-Connection function accomplishes orders received from the node function. It establishes the connection through the switch and controls the hardware associated with the system switches by signalling to concerned device processors. The Switch-Connection handles switch-internal resources, such as internal channel numbers.

Description of the Reference Points

Reference Point b

The b reference point describes the interactions between the functions Node-Connection and Switch-Connection. Node-Connection provides Switch-Connection with two switch addresses in form of DAs and channel numbers.

Reference Point c

The c reference point describes the interactions between functions in the network layer, and Node-Connection. Zone-Connection provides Node-Connection with two node addresses which point out NRGs and channel numbers.

Reference Point d

The d reference point describes the interactions between Zone-Connection functions residing in different zones. The initiating Zone-Connection function provides the other with trunk group, seized resource, and the end-point address of the destination point.

Reference Point e

The e reference point describes the interactions between the functions Node-Connection and Device-Connection. Node-Connection provides Device-Connection with an address to a device, for example Device and channel number.

Reference Point f

The f reference point describes the interactions between the functions Virtual-Node-Connection and Node-Connection, where the latter handles a connection through a node in an underlying stratum.

Virtual-Node-Connection provides Node-Connection with two addresses in the underlying node, in form of NRGs and channel numbers.

Reference Point g

The g reference point describes the interactions between Dynamic-Infrastructure-Handler functions residing in different zones.

The interaction has two phases the initial phase asks for and receives a trail-termination endpoint from the far end, the request must contain remote end trunk group, the answer contains the trail termination end-point to use; the final phase coordinates the addition of new resources to the trunk groups when the trail has been established, the coordination must contain the trunk group resources that should be associated on both sides.

Reference Point h

The h reference point describes the interactions between adaptation layer applications (as a VLL application) and the function Point-to-MultiPoint-Node-Cross-Connection. Adaptation layer applications provide Point-to-MultiPoint-Node-Cross-Connection with network addresses, representing points at the border of one node, in form of zone, node, CRGs, and channel numbers. The connection will be persistently stored and will be implemented according to the new MO architecture.

Reference Point k

The x reference point describes the interactions between the functions Zone-Trail and Node-Trail-Termination. Zone-Trail provides Node-Trail-Termination with the address representing the trail-termination point in form of NRG and channel number.

Reference Point l

The l reference point describes the interactions between the Node-Trail-Termination and Trail-Termination. Node-Trail-Termination provides Trail-Termination with the address representing the trail-termination point in form of Device and channel number.

Reference Point m

The m reference point describes the interactions between the applications and the function Point-To-Multipoint-Zone-Connection.

Applications provide Point-To-Multipoint-Zone-Connection with addresses, representing points at the border of the telecommunication network, in form of network elements NE s, nodes, CRGs, and channel numbers.

Reference Point n

The n reference point describes the interactions between Zone-Trail functions residing in different zones. The initiating Zone-Trail function provides the second with incoming trunk group, and resource and address of the destination point and termination.

Reference Point o

The o reference point describes the interactions between adaptation layer applications (as a VLL application) and the function Node-Cross-Connection.

Adaptation layer applications provide Node-Cross-Connection with network addresses, representing points at the border of one node, in form of zone, node, CRGs, and channel numbers. The connection will be persistently stored and will be implemented according to the new MO architecture.

Reference Point p

The p reference point describes interactions between Point-to-Multipoint-Zone-Connection functions residing in different zones.

The initiating Point-to-Multipoint function provides the second with incoming trunk group and resource and address of an end point.

Reference Point q

The q reference point describes the interactions between the applications and the function Zone-Performance-Monitoring.

Reference Point r

The r reference point describes the interactions between the functions Dynamic-Infrastructure-Handler and Asymmetric-Zone-Trail.

Dynamic-Infrastructure-Handler provides Asymmetric-Zone-Trail with an end-point specification in form of zone and node for the trail termination, and one end-point address in the form zone, node, CRG and channel number for the connection termination.

Reference Point s

The s reference point describes the interactions between the functions Zone-Performance-Monitoring and Node-Performance-Monitoring.

Reference Point t

The t reference point describes the interactions between the applications and the function Zone-Trail-Termination. Applications provide Zone-Trail-Termination with an address, representing the trail-termination point, in form of zone, node, CRG, and channel number.

Reference Point u

The u reference point describes the interactions between the applications and the function Zone-Connection.

Applications provide Zone-Connection with two end-point addresses, representing points at the border of the telecommunication network, in form of zones, nodes, CRGs, and channel numbers.

Reference Point v

The v reference point is used both by applications and the function Dynamic-Infrastructure-Handler. It describes the interactions between the function Zone-Trail and applications, or between Zone-Trail and the function Dynamic-Infrastructure-Handler.

An application or Dynamic-Infrastructure-Handler provides Zone-Trail with two end-point specifications in form of zones and nodes.

Reference Point w

The w reference point describes the interactions between the trunk group object and the function Dynamic-Infrastructure-Handler.

Two termination fabrics, which each can group a number of possible trail termination points, are indicated.

Reference Point z

The z reference point describes the interactions between the functions Node-Performance-Monitoring and Performance-Monitoring. Performance-Monitoring is located in the component layer.

OBJECTS IN THE NETWORK LAYER OF THE RESOURCE MODEL

BearerServiceManagement

The BearerServiceManagement object is the top object for all bearer service networks within an NE.

XX Network

Represents a bearer service network, and contains all fabrics in the bearer service network in the NE. It is included in the network layer of the Resource Model but mainly keeps the fabrics in the network together and thus acts as a kind of addressing notion. There is only one network object per bearer service and zone (NE). The NCH functionality can also be tied to this object, which in such case can be used for function addressing (starting the right function).

XX Logical Network

A logical network is a configured network with a specified subscription of the resources within a bearer service network. The logical network object shows the logical networks that the specific bearer service network supports.

XX Fabric

The XX Fabric represents a node in a certain stratum. By specialization we obtain an XX Fabric object for each bearer service, i. e. VP Fabric, 64 k Fabric, COPS Fabric etc.

XX Virtual Fabric

The XX Virtual Fabric is similar to the ordinary XX Fabric but represents a node without switching capability for the stratum in question. For instance, a VC Virtual Fabric can represent a VP node in the VC stratum, and vice versa.

The Virtual Fabric is required in the logical networks when the underlying infrastructure is established dynamically. (See chapter XXX for further description of dynamic establishment of infrastructures.) There is no need for the XX Virtual Fabric if the infrastructure is configurated.

XX Routing

The routing tables for the network are distributed to the nodes in the network in form of XX Routing objects. The routing object can be seen as a table where the input data is the destination point in the form of NE and fabric, and the output data is a list of trunk group alternatives to get there. By picking one of the trunk groups in the list, the network function implicitly decides the next node to pass. The routing object also includes data for the subscription of resources to the different logical networks. In this way it is possible to have resource separation or resource competition between logical networks.

The XX Routing resides under fabric in the network layer of Resource Model and is specialized for each bearer service.

XX TrunkGroup

The XX TrunkGroup resides in the network layer of the Resource Model and groups an arbitrary number of CRGs connected to the same node. XX TrunkGroup objects represent the end-points of routes between nodes. An XX TrunkGroup object is always configured to another XX TrunkGroup object, representing the other end point of a route. It is possible to optimize the implementation when both trunk group objects are within the same zone. Then it is possible to have only one common resource handler for the objects in both ends. The trunk group holds information regarding the allocation of resources to the logical networks.

The XX TrunkGroup is specialized for each bearer service. This object may have a relation to a fabric controlling the termination of a trail in an underlying stratum.

XX CRG (Connection Resource Group)

The XX CRG object represents a group of resources at the edge of an XX node and keeps a view of these resources. The XX CRG object contains a number of parameters defining the limitations originating from the physical level, such as the maximal bandwidth, maximal number of simultaneously established connections, and VPI range. Both resources for connections and trail terminations are handled.

One or more resource handlers can be configured to a CRG implying that the they will reserve different parts of the resources in the CRG.

One or more CRGs may be configured to an NRG in the same stratum. It is still an open issue to what extent the CRGs will be autoconfigurated. Several XX CRG objects in the same stratum can represent resources on the same physical link.

XX Network Path

An NCH network object that represents a connection through a NE or a zone The object may represent durable connection data stored in the DBN or dynamic connection data residing in a process.

Objects in the Node Layer of the Resource Model

XX Node

The XX Node object resides in the node layer. It represents a logical node for one bearer service and has a configurated relation to the XX Fabric object in the network layer. These two objects are included in the interface between the network functions and the node functions.

The XX Node has also configurated relations to the XX Device and the XX Switch objects. The XX Node and XX Device form the interlace between the node functions and the device functions. In the same way, the XX Node and XX Switch form the interface between the node functions and the switch functions.

XX NRG (Node Resource Group)

The XX NRG object encapsulates the node and hides the components for the network layer. The main tasks for the XX NRG object are to propagate fault conditions to the CRG objects in the network layer, and to serve as an addressing entity towards the node layer.

The objects in the component propagates occurred faults to the network objects via the NRG objects. By reporting the fault via the NRG object the network is guaranteed one report for each occurred fault instead of two, one report from each component.

XX Node Path

An NCH node object that represents a connection through a node. The object may represent durable connection data stored in the data base or dynamic connection data residing in a process.

Objects in the Component Layer of the Resource Model

XX Device

The XX device object represents the part of an equipment which is handled/controlled by NCH functions and keeps a view on the limitations of that part e.g. bandwidth, channel numbers etc. The XX Device object resides in the component layer of the resource model. It is name bound to the XX Node object in the node layer of resource model and has a relation to the NRG object in the node layer. XX Node and XX Device form the interface between the node functions and the device functions.

The XX Device propagates fault conditions to the XX NRG objects in the node layer of resource model.

XX Device Path

An NCH device object that represents a connection through a device. The object may represent durable connection data stored in the DBN or dynamic connection data residing in a process.

XX Switch

The XX Switch object resides in the component layer of resource model. The XX Switch object represents a logical switch unit. It has a configurated relation to the XX Node object in the node layer of resource model. XX Node and XX Switch objects form the interface between the node functions and the switch functions.

XX DA

The XX DA represents an entrance and exit point of the switch. It keeps a view of the limitations associated with the HW. Examples of such limitations can be maximal bandwidth on the CBI, maximal number of simultaneously established connections, and VFI value range.

The XX DA propagates fault conditions to the XX NRG in the node layer of resource model.

XX Switch Path

An NCH switch object that represents a connection through a switch. The object may represent durable connection data stored in the DBN or dynamic connection data residing in a process.

What is claimed is

1. A network and connection handling architecture for forming a telecommunication network that uses a number of different switching technologies, each of the switching technologies being supported by a common platform on which different telecommunication applications can run, and for establishing connections in the telecommunication network, the network and connection handling architecture comprising a resource model having a network layer, a node layer, and a component layer, wherein each layer includes resource objects used by each of the switching technologies, the resource objects of the network layer are encapsulated to the applications, the resource objects of the node layer are encapsulated to the resource objects of the network layer, and the resource objects of the component layer are encapsulated to the resource objects of the node layer; and connection handling means for setting up connections in the telecommunication network, wherein the connection handling means has a network layer component, a node layer component, and a component layer component that correspond to the layers of the resource model;

wherein the network layer component operates on resource objects of the network layer, the node layer component operates on resource objects of the node layer, and the component layer component operates on resource objects of the component layer.

2. The network and connection handling architecture of claim 1, further comprising a first reference point at which an application communicates with the network layer component, a second reference point at which the network layer component communicates with the node layer component, and third and fourth reference points at which the node layer component communicates with the component layer component.

3. The network and connection handling architecture of claim 2, wherein the network layer component establishes different types of connections requested by different applications by performing network routing, resource handling of trunk groups, and network element communication, the node layer component distributes orders to the component layer component, and the component layer component carries out the orders received from the node layer component.

4. The network and connection handling architecture of claim 3, wherein the node layer component reflects a distribution of functionalities between resource objects of the node layer and resource objects of the component layer.

5. The network and connection handling architecture of claim 3, wherein the network layer component of a first network element interworks with the network layer component of a second network element.

* * * * *